United States Patent [19]

Waterhouse

[11] Patent Number: 4,633,996
[45] Date of Patent: Jan. 6, 1987

[54] BELT-CONVEYOR FRAME

[75] Inventor: John C. Waterhouse, Sydney, Australia

[73] Assignee: Timalara Pty. Limited, Allambie Heights, Australia

[21] Appl. No.: 702,238

[22] PCT Filed: May 18, 1984

[86] PCT No.: PCT/AU84/00091
§ 371 Date: Jan. 30, 1985
§ 102(e) Date: Jan. 30, 1985

[87] PCT Pub. No.: WO84/04740
PCT Pub. Date: Dec. 6, 1984

[30] Foreign Application Priority Data
Jun. 1, 1983 [AU] Australia .............................. PF9636

[51] Int. Cl.[4] .............................................. B65G 47/34
[52] U.S. Cl. ...................................... 198/372; 198/839
[58] Field of Search ................................ 198/365–367, 198/372, 839, 598, 370, 440, 732

[56] References Cited
U.S. PATENT DOCUMENTS 3,232,417  2/1966  Muller .................................. 198/367
3,587,830  6/1974  Calistrat ............................... 198/732
4,328,889  5/1982  Maxted ................................ 198/367

FOREIGN PATENT DOCUMENTS 433756  8/1935  United Kingdom ................ 198/839

Primary Examiner—Joseph E. Valenza
Assistant Examiner—Kyle E. Shane

[57] ABSTRACT

A belt conveyor frame including a supporting surface for an endless conveyor belt, a slot across the surface formed of two parallel faces and at an angle to the direction of proposed belt travel and over which the conveyor belt will move in opposite directions to two pulleys and disposed below and to the sides of the faces. The conveyor belt in passing over the faces, around the pulleys and then over the other face provides an angled discontinuity in the conveying surface of the belt. An interceptor device with diverter plates movably attached to an endless flexible member is mounted in the discontinuity so that the plates can be selectively raised to intercept and deflect an object passing on the conveyor.

2 Claims, 8 Drawing Figures

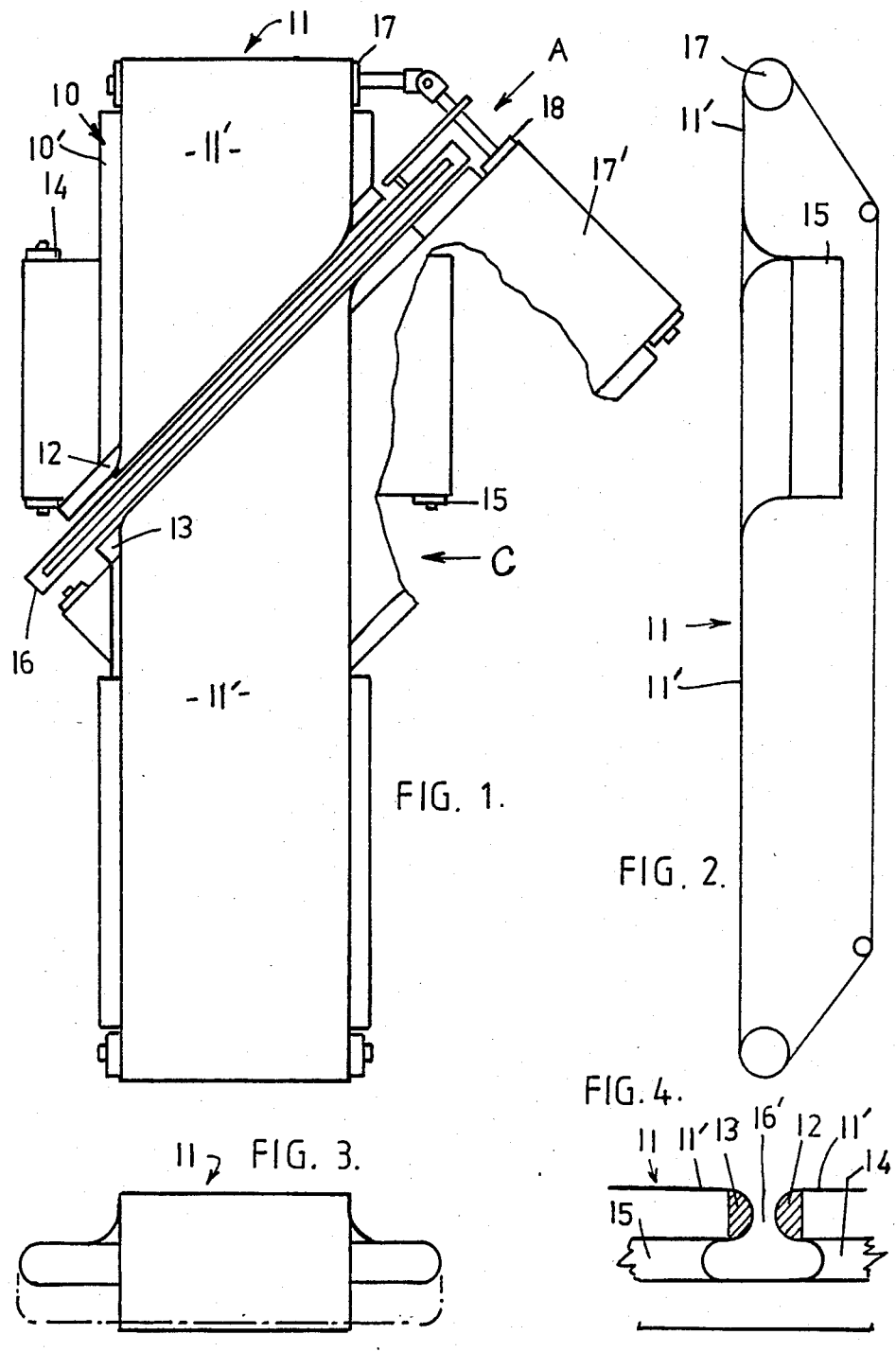

BELT-CONVEYOR FRAME

The present invention relates to the selective diversion of individual objects moving along a conveyor belt in such a way that the diversion can be effected of any one object from a stream of objects without disturbing the movement of objects immediately preceding or following at a rate of diversion not hitherto possible.

In the design of certain conveyor systems the requirement to achieve the automatic highspeed sortation of packages frequently arises. For instance, a particularly common application of this nature is for sorting packages at a post office into specific mail destination categories. In such a case all the packages are placed one by one on a single conveyor which passes across the ends of a number of chutes. As each package is placed on the conveyor its destination is entered on a keyboard and the package is then automatically diverted into the prescribed destination chute by a mechanism mounted on the conveyor adjacent to the chute.

The method of signalling the prescribed diverter to operate, when a package arrives, varies for different conveyor manufacturers but more recently the use of microprocessors and limit switches along the conveyor has been employed and particularly accurate signalling to the one or more diverter mechanisms involved can be guaranteed.

The main requirements for a diverter mechanism are that it should effectively transfer a nominated package from a conveyor without interfering with the passage along the conveyor of other packages not nominated to be diverted by that diverter. Because of the need not to interfere with packages not destined to be diverted and at the same time to enable a high total throughput along the conveyor to be obtained, the diverter must operate in a short length of time and space along the conveyor, at the same time the impact of the diverter upon the package must not cause any damage to the package.

One particular known system uses a pusher plate which extends across the conveyor and retracts when the package has been diverted. As the pusher plate extends across the conveyor, the package to be diverted is deposited on another conveyor. The disadvantage of this system is that it is only suitable for slow speed application as high speed operations would cause package damage.

In order to overcome the problem of a pusher plate having to traverse the full width of the conveyor and return, where the nature of the item to be diverted permits, another design of diverter employes chains running through a roller conveying surface. A pair of chains may be fitted with pusher dogs to pass between rollers of a conveyor at right angles to the path of the conveyor. However this device is suitable only for items of a constant size because of the necessity for the dogs to engage evenly.

A variation of the chain diverter used with roller conveyor is to employ a single chain, to place it at an angle through the rollers of the main conveyor. This design involves the raising and lowering of the chain to divert selected packages. The diversion operation itself is effective, but problems arise in the mechanism for raising and lowering the chain and the guiding of the chain itself.

Also since the raising and lowering of the chain crosses the whole of the main conveyor, this necessarily determines the minimum gap between packages and hence limits the speed of operation particularly where there is a mixture of long and short packages being carried.

In further elaboration of this last disadvantage which is common to most currently used diverter mechanisms, the spacing of all packages irrespective of length must be equal to the length of the longest item plus clearance, whereas, as will be shown in the present invention, spacing is only required by the individual length of each package plus clearance.

An earlier invention of the applicant consists of a conveyor diverter mechanism comprising an endless chain fitted at intervals with diverter sections which may be drawn across a conveyor to engage objects to be diverted, otherwise sections of the chain not fitted with diverter sections are positioned across the conveyor whereby objects are allowed to pass without being diverted.

Working examples of this last invention have highlighted the following disadvantages. One is that the positioning of the diverter sections involves a degree of accuracy and continuous stopping and starting of the chain drive. A second disadvantage is that since this type of diverter, as all previous chain diverters, has been developed to run between rollers, at the higher conveyor speeds involved, the noise of the rollers has become a serious problem.

Thirdly since the diverter sections are of fixed length they again are necessarily designed to suit the length of the longest object to be diverted and the mechanism is less efficient if short objects also are to be diverted.

Fourthly many objects are unsuitable for carrying along a roller surface in as much as roller conveyor and diverter devices used therewith are not suitable for many sorting systems where the item to be diverted does not have a smooth flat stable surface bearing on the carrier rollers.

It is an object of the present invention to overcome or substantially ameliorate the above disadvantages by modifying the last mentioned device and incorporating it into a specially constructed belt conveyor which also forms part of the present invention.

There is disclosed herein an endless flexible elongated member, traversing through the body of a conveyor on which are loosely attached diverter plates which may be selectively raised to engage an object passing along the conveyor, the pathway of said member comprising a passageway at an oblique angle through a belt conveyor of which the belt is the conveying surface.

A preferred form of the present invention will now be described by way of example with reference to the accompanying drawings wherein FIG. 1 is a plan view of a complete diverter mechanism operating at an angle of 45 degrees to the main conveyor belt carrying direction.

FIG. 2 is a side elevation of the path of the main conveyor belt.

FIG. 3 is an end elevation of the path of the main conveyor belt.

FIG. 4 is a view of the path of the main conveyor belt as seen looking in the direction of arrow A of FIG. 1.

Figure 5:
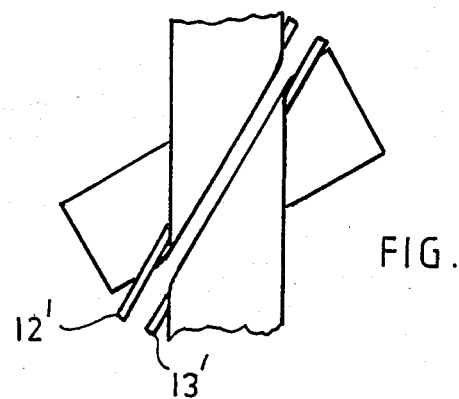
Figure 6:
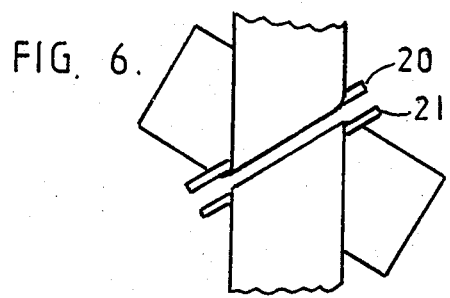

FIGS. 5 and 6 are plan views of paths of main conveyor belts where the diverter mechanism is placed at angles less than 45 degrees and greater than 45 degrees respectively to the main conveyor belt carrying direction.

Figure 7:
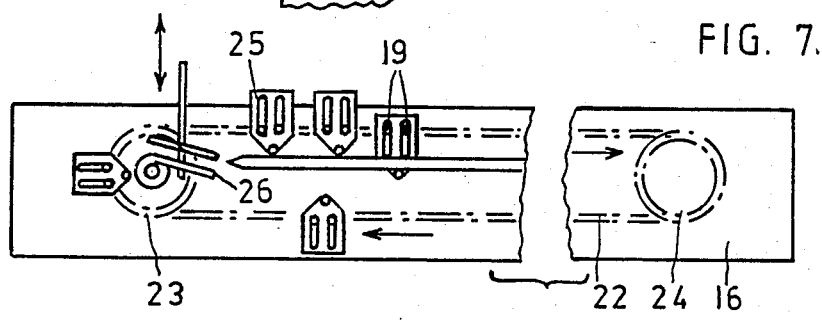

FIG. 7 is a side view of item 16 of FIG. 1.

Figure 8:
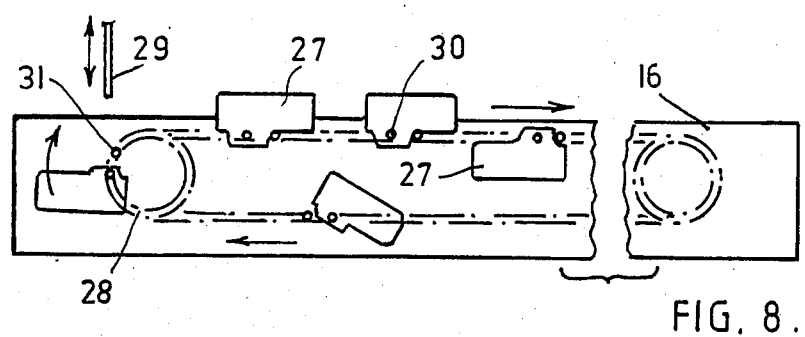

FIG. 8 is an alternative form of item 16 of FIG. 1.

In FIG. 1, the conveyor assembly is shown as C and includes a supporting structure or frame 10 which supports all other items in their relationship as shown and as described below.

Item 11 is an endless belt the upper portions of which are supported atop belt supporting surfaces 10' and which is routed to pass around fixed curved faces or edgings 12 and 13 and pulleys 14 and 15 so that a passageway or slot 16' is provided between the opposed ends of the belt upper surfaces 11', for the mounting of a diverter mechanism or interceptor device 16.

By way of describing the complete diverter example shown, 17 is an end pulley. 18 is also an end pulley to which drive may be applied and which in turn transmits drive to the interceptor device 16 and in the arrangement shown also drives optional secondary belt 17'.

FIGS. 2 and 3 show how the route of the endless belt 11 of FIG. 1 appears when viewed from the side and end respectively.

In FIG. 3 an alternative path of the belt is shown chain dotted in which case two pairs of pulleys similar to 14 and 15 would be incorporated to create a deeper passageway to accommodate a larger deflector mechanism.

FIG. 4 shows the passageway or slot 16' created for the mounting of the interceptor device and particularly the fixed curve surfaces 12 and 13 around which the belt 11 is passed.

While a diverter angle of 45 degrees would be most common and convenient, if special circumstances demanded, frame arrangements to provide diverter angles less than and greater than 45 degrees would adopt configurations shown in FIGS. 5 and 6 respectively. The appropriate fixed curved surfaces are indicated by 12', 13' and 20, 21.

In FIG. 7 it is shown how the diverter mechanism 16 of FIG. 1 comprises an endless roller chain 22 passing around sprockets 23 and 24. The rollers of the chain are hollow and pairs of shouldered pins 19—19 are mounted therein to provide a loose retention for slideable diverter members or plates 25. As these plates travel around and leave pulley 23, gate mechanism 26 may be selectively operated so that they are guided to travel along the top strand of the chain in either a raised or lowered attitude. In the raised position they would be protruding above the carrying surface of belt 11 and hence would intercept and deflect off the belt any objects being carried. In the lowered position as reflected by the right-hand plate 25, they would pass below and clear of anything passing along the carrying surface of belt 11.

In FIG. 8 chain and sprockets of the diverter mechanism 16 are similar to those of FIG. 7; however diverter members or plates 27 pivot on one shouldered pin 30 and rest against a second or stop pin 31 in either a raised or lowered attitude as they pass along the top strand of the chain. In this arrangement as the plates swing around pulley 28 they normally continue to rest in a raised attitude and deflector or interrupter arm 29 is selectively lowered to place them in a lowered attitude as shown by the right-hand plate 27.

Accordingly in the operation of the above mechanisms, conveyors and interceptor devices are continuously rotated, only a sufficient number of diverter attachments are raised to suit the length of each individual item to be diverted, and the advantages of substituting belt carrying surfaces for others as previously described are obtained.

It is asserted that the absolute requirement to provide a flat belt carrying surface with a means to transfer therefrom at speeds unobtainable or unacceptable using currently known mechanisms can only be achieved by the invention herein described.

I claim:

1. A conveyor assembly comprising an endless conveyor belt having an upper surface and adapted to provide a plurality of runs, a belt supporting structure including a belt supporting surface having a diverter slot extending therethrough at an angle to the direction of belt movement over said supporting surface, a semi-circular edging on each side of said slot over which two said conveyor belt runs move in opposite directions, said edgings having the same radius of curvature which is equal to the spacing apart of the closest portions of said edgings, two parallel belt pulleys located one to each side of and below said belt supporting surface at a distance such that said conveyor belt runs disposed between said edgings and said belt pulleys are in the same plane and parallel to the plane of said belt supporting surface, a diverter mechanism aligned within said slot and including a plurality of continuously linearly moving diverter members, selectively operable means to determine whether said members while moving will adopt retracted positions below the upper surface of the said conveyor belt passing over said belt supporting surface or raised positions whereby said members project through said diverter slot above the upper surface of said conveyor belt passing over said belt supporting surface.

2. A conveyor assembly as claimed in claim 1 wherein, said diverter members comprise plates pivotally connected to an endless chain and said selectively operable means comprises a deflector which when in an active position lies in the path of said deflector members to prevent them from adopting said raised positions and when in an inactive position allows said deflector members to adopt said raised positions.

* * * * *